UNITED STATES PATENT OFFICE.

CONRAD ZIMMER, OF BARCELONA, SPAIN.

MASHING PROCESS.

934,783.

Specification of Letters Patent.   Patented Sept. 21, 1909.

No Drawing.   Application filed October 31, 1906.   Serial No. 341,449.

*To all whom it may concern:*

Be it known that I, CONRAD ZIMMER, a subject of the German Emperor, and a resident of Barcelona, Spain, have invented certain new and useful Improvements in Mashing Processes, of which the following is a specification.

This invention relates to mashing processes.

It has been found that the disagreeable "aftertaste" as well as the difficulty of preserving beer is caused by certain constituents of the malt husks which pass into the wort when the temperature of the mashing process is maintained above a certain limit. It has been found that if the temperature of the mashing process is kept below 75° centigrade this constituent of the malt husks does not pass into the wort. Therefore it has been proposed to grind the malt to separate the husks from the meal and to separately mash the husks and meal in separate mash tubs, the temperature of the husk mash tub being kept below 75° centigrade. The wort is then drawn from the separate mash tubs, discharged into a common vat and treated in the usual manner. Since, however, even after the most careful sieving a considerable quantity of the meal will cling to the husks and since the husk mashing is performed at a comparatively low temperature, it has been found difficult to obtain a high percentage of the extract from the husk mash.

The object of this invention therefore is to provide a process in which the objectionable constituent of the husk does not pass into the wort and at the same time to obtain a high percentage extract or wort.

According to this invention the malt is ground and the husks and mealy portion are sieved and separated as much as possible. The husks are then ground in water between smooth rolls so as to reduce the mealy portion clinging to the husks to as fine a condition as possible and to separate as much of the meal still clinging to the husk as is possible. The husk is then passed into a husk mash tub and there mashed at a temperature below 75° centigrade. In this way by keeping the temperature below 75° centigrade the objectionable constituent in the husk is prevented from going into solution into the wort. At the same time since the meal clinging to the husks is in a finely divided condition and since the greatest part has been separated from the husks in the previous process by which the husks were ground in water between smooth rolls, it is possible to obtain a high percentage extract from the husks. After the mashing continues for a suitable period, the wort is drawn off into a suitable tub. The mealy portion of the malt which was separated from the husks in the sieving operation, is mashed in a separate mash tub. In this case, however, it is not necessary to keep the temperature below 75° centigrade. The wort from this mash tub is drawn off and mixed with the wort drawn from the husk mash tub and the mixture is then boiled in the usual manner.

Having described the invention what is claimed is,

1. The herein described process of brewing beer, consisting in grinding the malt husks with water, mashing in a tub at a temperature not exceeding 75° centigrade, and separating the liquor from the solid components of the mash.

2. The herein described process of brewing beer, consisting in grinding the malt, separating the husks from the meal, grinding the husks with water, mashing in a fore-mashing tub at a temperature not exceeding 75° centigrade, mashing the meal in a separate mash tub, and drawing the liquor from the tubs into a common vat.

3. The herein described improvement in the process of brewing beer consisting in separating the husks from the mealy portions of the malt, grinding the mealy portion with water and passing it into a fore mashing vat, separately grinding the husks with water and passing them into another fore mashing vat, treating the contents of the latter vat at a temperature of about 75° centigrade, introducing the clear mash from both said vats to another mash tub, and boiling said mash.

In testimony whereof I have signed my name to this specification in the presence of two subscribing witnesses.

CONRAD ZIMMER.

Witnesses:
BENJ. H. RIDGELY,
STANLEY C. HARRIS.